Jan. 1, 1952 P. H. LINDBERG 2,580,802
TANK INLET AND OUTLET SEAL
Filed March 29, 1948 2 SHEETS—SHEET 1

INVENTOR.
Peter H. Lindberg
BY Myron J. Dikeman
ATTORNEY

Jan. 1, 1952    P. H. LINDBERG    2,580,802
TANK INLET AND OUTLET SEAL
Filed March 29, 1948    2 SHEETS—SHEET 2

INVENTOR.
Peter H Lindberg
BY Myron J. Dikeman
ATTORNEY

Patented Jan. 1, 1952

2,580,802

UNITED STATES PATENT OFFICE 2,580,802

TANK INLET AND OUTLET SEAL

Peter H. Lindberg, Detroit, Mich.

Application March 29, 1948, Serial No. 17,665

3 Claims. (Cl. 220—39)

The object of my invention is to produce a detachable tank inlet and outlet unit that can readily be mounted on sheet metal, liquid or gas, tanks having specially prepared flanged tank openings, or may be easily removed therefrom.

Another object is to provide a tank inlet or outlet seal that will form a liquid tight joint with the flanged tank opening section, without soldering or welding thereto.

A further object is to produce a tank inlet seal that can be manufactured wholly by automatic machine work, and from uniform standard material.

A still further object is to produce a special tank inlet and outlet seal that is simple in construction, easily installed, effective in operation and that can be manufactured at a very low cost.

These several objects are secured in the preferred form by the construction and arrangements of parts and sections as are more fully hereinafter set forth.

Similar parts on all drawings are marked by similar numerals or letters.

Figure 2:
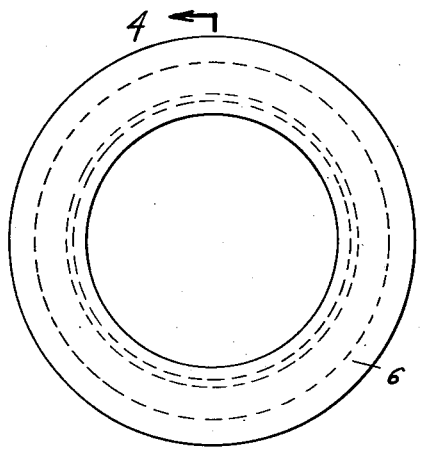
Fig. 2 is a top view of the tank intake unit having a special closing cap mounted thereon.

I will now describe more fully the detailed construction of my device, referring to the drawings and the marks thereon.

In general, my tank inlet and outlet seal comprises a threaded tubular thimble section having a special seal collar and a clamp collar mounted thereon, designed for receiving the beveled flanged edges of a tank wall opening therebetween, said collars being tightly clamped together by an engaging clamping unit also mounted on the central threaded thimble adjacent thereto, and securely tightened thereon by any suitable means.

Figure 3:
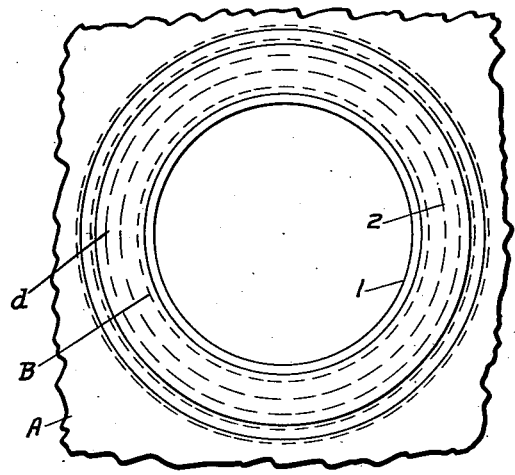
Fig. 3 is a bottom view taken on the line 3—3 of the Fig. 1, showing the tank wall depression and the intake seal ring mounted therein.
Figure 1:
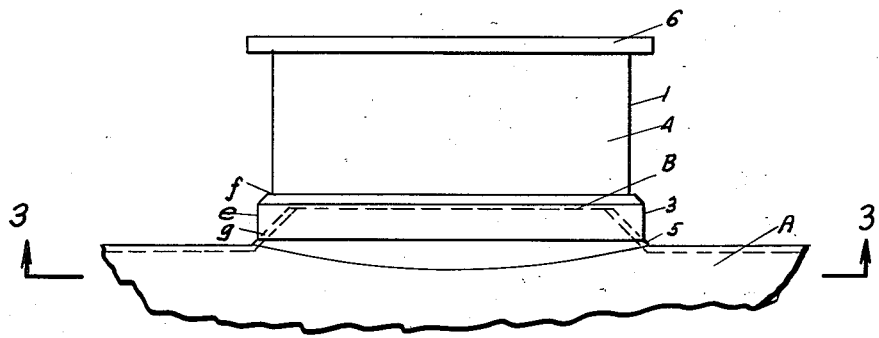
Fig. 1 is an elevation of my tank inlet and outlet seal showing the general exterior arrangement of the assembled parts as applied to a sheet metal tank flanged wall opening.
Figure 4:
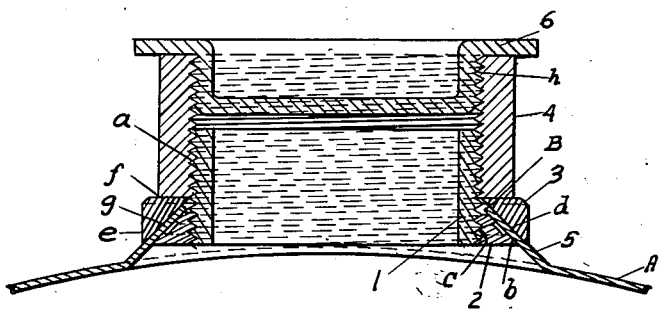
Fig. 4 is a vertical sectional view taken on the line 4—4 of the Fig. 2, showing the relative position of the various assembled parts.
Figure 6:
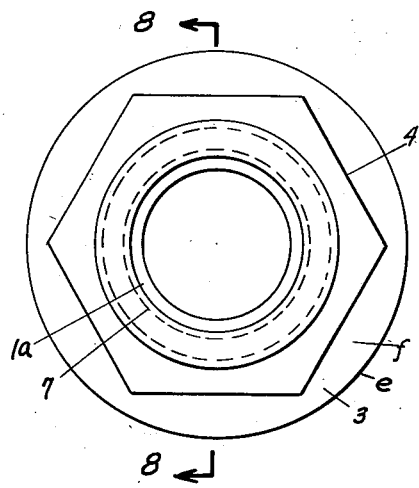
Fig. 6 is a top view of the Fig. 5, showing the general arrangement of the modified design.
Figure 7:
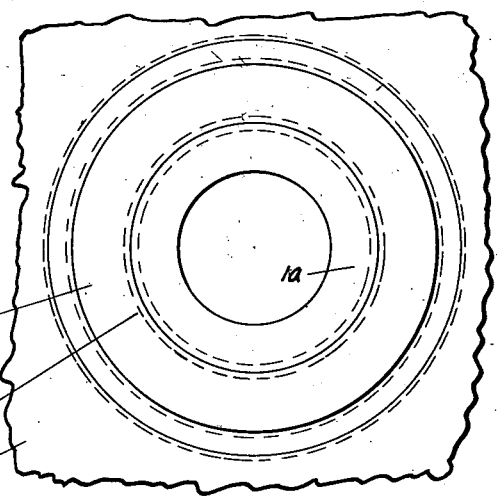
Fig. 7 is a bottom view taken on the line 7—7 of the Fig. 5, showing the seal ring applied to the tank recess opening.
Figure 5:
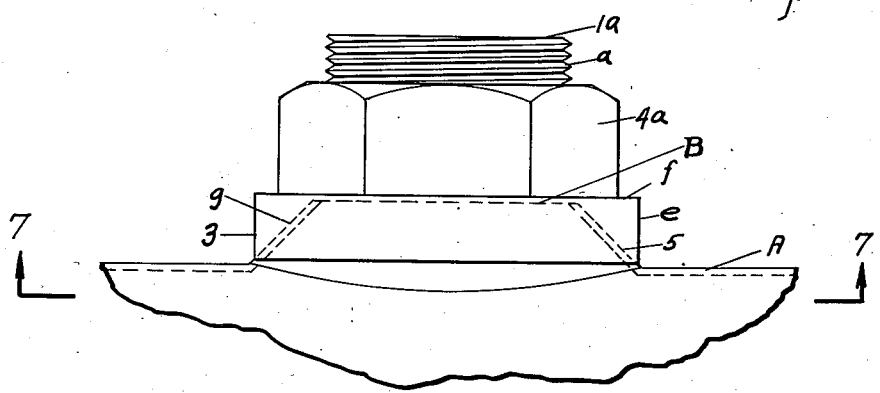
Fig. 5 is an elevation of a modified intake seal unit formed with an extended central thimble and provided with a special nut clamping unit thereon instead of the cylindrical clamping unit previously shown.
Figure 8:
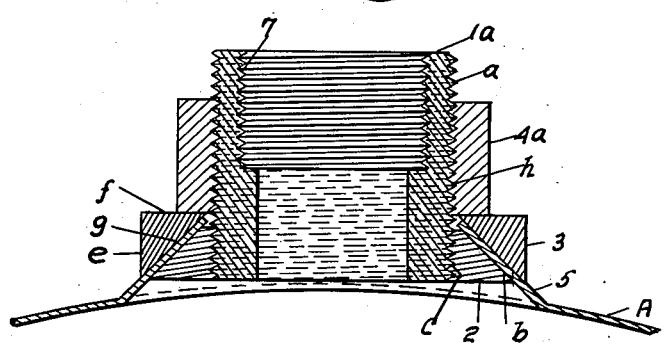
Fig. 8 is a vertical sectional view taken on the line 8—8 of the Fig. 6, showing the relative position of the modified assembled units.

The preferred design of my invention is illustrated in the Figs. 1 to 4 of the drawings, and the Figs. 5 to 8 show a slight modification thereof. The central thimble 1 is a tubular section, made of suitable metal, and formed with external threads $a$ the full length thereof. Threadably mounted on one end of the thimble 1 is a circular seal collar 2 also made of suitable metal, formed with an outer beveled surface $b$ and with internal threads $c$ designed to fit tightly over the thimble threads $a$. The seal collar 2 is formed with true turned surfaces throughout, and where required for high pressure tanks, may also be provided with a special seal groove $d$ around the beveled surface $b$, positioned concentrically therewith. The said seal groove $d$ may be filled with a soft pliable metal sealing ring, such as soft lead or similar metals readjustable under pressure, or with any suitable sealing material, before assembling the various units. The seal collar may also be pressed or welded on the thimble if desired. Also mounted over the thimble body 1 is a circular clamp collar 3, made of suitable turned metal, designed of a triangular cross-section having vertical and horizontal outer walls $e$ and $f$ respectively, and with a beveled conical inner wall $g$ formed parallel to and concentric with the corresponding conical outer surface $b$ of the adjoining seal ring 2, forming a pressure seal joint therebetween. The clamp collar 3 is formed with a central circular opening concentric therewith, designed to slip over the threaded body of the central thimble 1, movable thereon. Threadably mounted over the thimble 1, is a heavy tubular lock unit 4, formed with internal threads $h$ throughout the full length thereof, designed to engage and fit the thimble threads $a$ and screw thereon to engage and displace the clamp collar 3, for rigidly clamping the conical flanged edges 5 of the tank opening against the adjacent seal collar 2. The lock collar 4 is preferably designed of a length somewhat greater than the supporting central thimble 1, and to project therefrom a predetermined length, providing means for threadably attaching an exterior unit thereto, herein illustrated as a special closing cap 6, although an extension pipe inlet or outlet may be mounted therein equally as well.

The liquid tank A, herein illustrated as cylindrical in cross-section, is of the ordinary sheet metal tank design, formed with a circular wall opening B, preferably constructed by suitable forming dies in the ordinary manner, providing a projected, flanged, opening with true conical walls of the same angular design as formed on the seal collar 2 and adjoining clamp collar 3.

In assembling my device, the seal collar 2 is tightly screwed over the end of the threaded thimble 1, with or without the soft seal ring in the collar groove d, and the assembled unit entered through the flanged conical tank opening B, from the inside thereof. The clamp collar 3 is then mounted over the projected thimble 1, outside the tank, positioned to engage the projected conical tank wall edges, and the tubular locking unit 4 then screwed over the thimble threads a, engaging and displacing said collar 3 against the tank wall flange 5 and rigidly clamping same against the adjoining seal collar 2, forming a liquid pressure joint therewith.

A modification of my invention is further illustrated in the Figs. 5 to 8 of the drawings, similar in general construction, but somewhat simplified in design, and is especially adaptable to small tank openings and outlet units. The general construction is the same as in the former design previously described, but with the central threaded thimble 1a extended out through the lock unit, said extended thimble being provided with an internal threaded section 7 at the outer end thereof, for receiving either a closing cap 6 therein as in the former case, or for receiving a threaded pipe section, depending upon the use and application of the tank inlet or outlet seal. The lock unit 4a is herein illustrated as formed of a hexagonal nut design, instead of the cylindrical lock unit 4 previously shown. Its application and operation is exactly the same as in the previous case.

Having fully described my tank inlet and outlet seal, what I claim as my invention and desire to secure by Letters Patent is:

1. A tank inlet and outlet connecting unit adapted for mounting on a conical flanged wall opening of a sheet metal tank and used therewith, comprising a tubular thimble section formed with external threads the entire length thereof, a conical seal collar formed with internal threads rigidly mounted on one end of said thimble, a reverse conical clamp collar mounted loosely over the thimble section positioned adjacent the fixed seal collar designed to receive the tank conical opening wall therebetween, and a threaded clamping unit designed to screw over the threaded thimble section for engaging and forcing the conical clamp collar and inclosed tank conical opening wall against the adjacent seal collar.

2. A tank inlet and outlet seal unit adapted for mounting on projected conically flanged tank wall openings and used therewith, comprising an externally threaded tubular thimble section, an internally threaded conical seal collar formed with an outer beveled surface tightly screwed on the inner end of said threaded thimble section, a reverse conical clamp collar formed with an inner beveled surface corresponding with said collar bevel, slidably mounted over the thimble body positioned adjacent the said beveled seal collar and designed for receiving the conical flanged tank opening edges therebetween, a lock unit formed with internal threads to fit and engage the said thimble threads and screw thereon for tightly clamping the two conical collar units together against the inclosed conical tank edges forming a pressure seal therewith, said lock unit being designed of a predetermined length to project beyond the end of the supporting thimble section, providing means for attaching external threaded members thereto.

3. A tank inlet and outlet connecting unit adapted for mounting on projected conical flanged tank wall openings and used therewith, comprising a tubular thimble section of predetermined length and formed with internal and external threaded sections, a conical seal collar formed with a beveled outer wall rigidly threadably mounted on one end of said thimble section, a reverse conical clamp collar formed with an internal beveled surface corresponding with the seal collar bevel, movably mounted over the thimble body, positioned adjacent the seal collar designed for receiving the conical flanged tank opening edges therebetween, and a threaded lock nut screwed over the thimble section and positioned against the conical clamp collar designed for tightly clamping the two collar sections tightly against the inclosed conical tank opening edges and forming a pressure seal joint therewith.

PETER H. LINDBERG.

REFERENCES CITED

The following references are of record in the file of this patent:

UNITED STATES PATENTS

| Number | Name | Date |
| --- | --- | --- |
| 473,461 | Hogan | Apr. 26, 1892 |
| 913,265 | Coppage | Feb. 23, 1909 |
| 1,453,299 | Wetzel | May 1, 1923 |
| 1,800,082 | Knigge | Apr. 7, 1931 |
| 2,267,754 | Schroeder | Dec. 30, 1941 |
| 2,333,968 | Winter | Nov. 9, 1943 |